United States Patent Office 2,840,389
Patented June 24, 1958

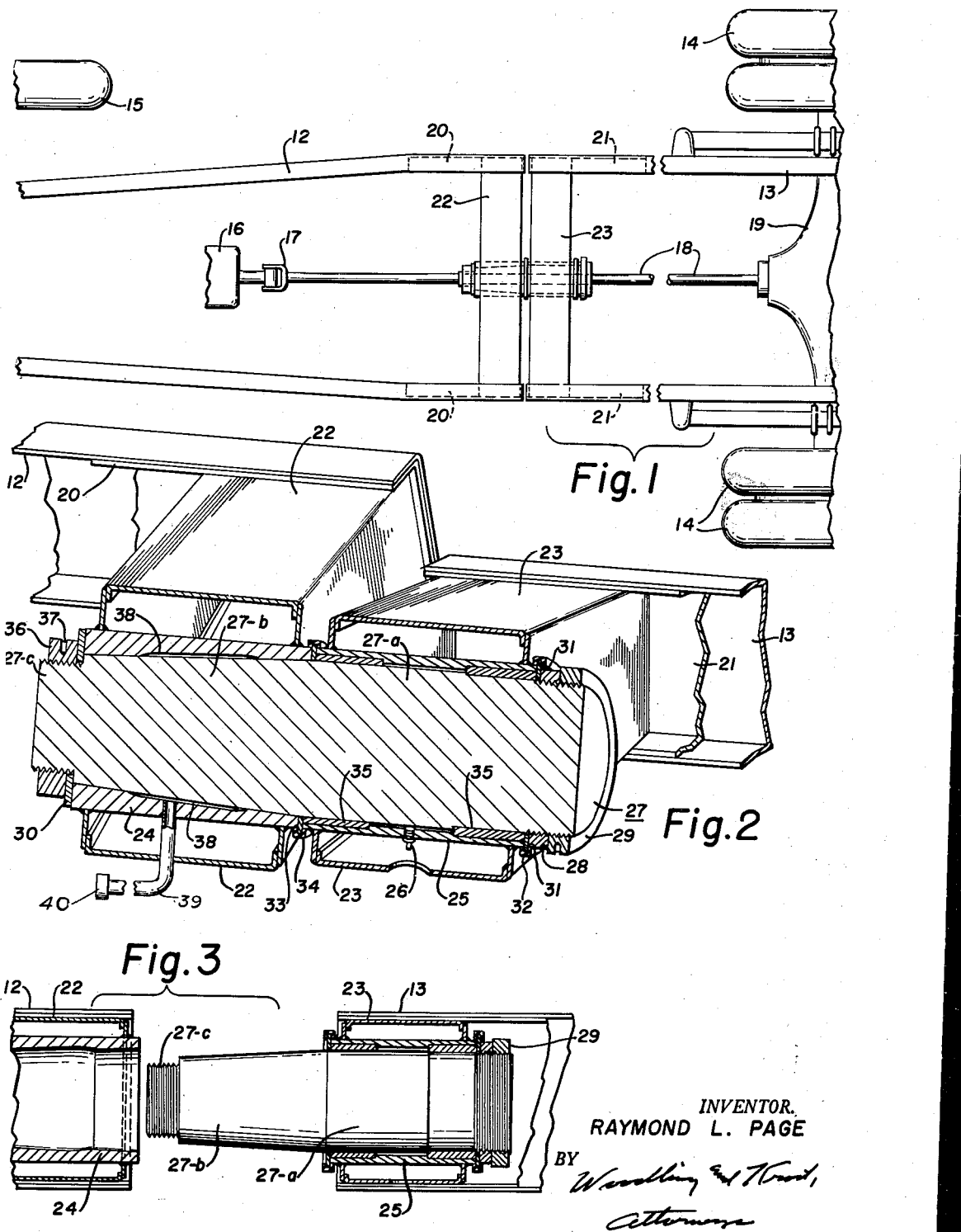

2,840,389
SWIVEL CONNECTION BETWEEN VEHICLE SECTIONS

Raymond L. Page, Brecksville, Ohio, assignor to Truckstell Manufacturing Company, a corporation of Ohio Application March 22, 1956, Serial No. 573,151

7 Claims. (Cl. 280—111)

My invention relates to pivot connections between divided sections of a vehicle.

In the constructions to which my invention is related, a vehicle, such as a truck, is in two sections—a forward section and a rearward section. Ordinarily the frame of the vehicle is separated along a transverse line to provide a forward frame portion and a rearward frame portion. These frame portions are arranged so that each may pivot around the axis of the vehicle.

An object of my invention is to provide an improved operation in pivot connections between forward and rearward portions of a vehicle.

Another object is the provision for facile interconnection of the forward and rearward portions of a vehicle.

Another object is to provide a construction in a pivot connection for forward and rearward portions of a vehicle which is particularly adapted for quick and ready axial alignment of the vehicle portions and of the mating parts of the connection.

Another object is the provision for quickly and accurately connecting two frame sections of a vehicle with a minimum of effort and care while assuring a properly aligned connection relative to the vehicle.

Another object is to provide unique results not heretofore obtainable.

Another object is to provide a construction in a pivot connection for vehicle sections which is economical in construction and efficient in operation.

Other objects and a fuller understanding of my invention may be had by referring to the following description and claims, taken in conjunction with the accompanying drawing, in which:

Figure 1 is a plan view of the chassis of a truck and illustrating the construction of my device in the truck chassis;

Figure 2 is an enlarged sectional view in perspective of the device embodying my invention taken along a vertical plane passing through the axis of my connecting device; and Figure 3 is a side elevational view, partly in section, of my device prior to assembly of parts and showing the mating parts in axial alignment.

The vehicle frame to which my invention is applied and as illustrated in the drawing has a front frame section 12 and a rear frame section 13. These are divided so that they may rock about the axis of the vehicle chassis and relative to each other. The rear wheels 14 of the truck or other vehicle are mounted upon a rear axle in an axle housing 19 suitably connected by springs to the rear frame section 13. Front wheels 15, of which a portion of one is shown, are similarly mounted on a front axle connected by springs to the front frame section 12. The motor or engine 16 is connected to a drive shaft 18 through a universal joint 17 to the rear axle in the axle housing 19 in the usual manner.

At adjoining ends of the front and rear frame sections 12 and 13 there are positioned reinforcing liners 20 and 21, respectively. The liners 20 and 21 are of U-shaped steel form and are welded or bonded to the opposite side members of the respective frame sections. Liners 20 are welded or otherwise secured to the side members of the front frame section and liners 21 are welded or otherwise secured to the side members of the rear frame section. Welded or otherwise secured to the liners 20 attached to the front frame section 12 is a front transverse member or element 22 extending across from one side to the other of the front frame section 12. Also, welded or otherwise suitably secured to the reinforcing liners 21 to the rear frame section 13 is a rear transverse member or element 23 extending across from one side to the other of the rear frame section 13. The transverse members or elements 22 and 23 are approximately parallel to each other and are spaced far enough apart that each may move relative to the other without interference, the members 22 and 23 being arranged to rock relative to each other about the axis of the vehicle frame.

The transverse members 22 and 23 are of boxlike construction and have a rectangular shape in cross-section. Each transverse member has a forward and rearward wall, which walls are substantially parallel to each other and have an upper and lower wall joining the forward and rearward walls to brace the same against deflection and to impart rigidity and strength to the transverse members. There are aligned openings through the transverse members 22 and 23 at the axis of the vehicle frame. Extending through this opening in the transverse member 23 is a cylindrical sleeve member 25. Extending through this opening in the transverse member 22 is a tapered socket member 24. The axes of the sleeve member 25 and the socket member 24 are in alignment and the openings of the sleeve member 25 and socket member 24 are in registration. The sleeve member 25 is welded or otherwise suitably secured to the forward and rearward walls of the transverse member 23. The socket member 24 is welded or otherwise suitably secured to the forward and rearward walls of the transverse member 22. Lubrication fittings, such as lubrication fitting 26, are mounted in the sleeve member 25. Access to the lubrication fitting 26 is through a suitable opening in the transverse member 23.

The internal bore of the sleeve member 25 is substantially cylindrical. There are spaced annular bronze bushings 35 positioned in the sleeve member 25, as shown in the drawing.

The internal bore of the socket member 24 has tapered walls which are inclined at an angle to the axis of the socket member. The larger diameter of the bore is next adjacent to the sleeve member 25. The smaller diameter of the bore in the socket member 24 is positioned forwardly of the vehicle and spaced away from the sleeve member 25.

Positioned within the registered bores of the sleeve member 25 and socket member 24 is a pivot pin member 27, which is long enough to extend outwardly from the rearward end of the sleeve member 25 and the forward end of the socket member 24. This pivot pin member 27 has a cylindrical portion 27–*a*, which is positioned within the sleeve member 25 and in bearing engagement with the bronze bushings 35. The pivot pin member 27 has a tapered portion 27–*b*. This tapered portion 27–*b* has its outer walls inclined at an angle to the axis of the pin member. The smaller diameter of the tapered portion 27–*b* is disposed forwardly, while the large diameter of the tapered portion 27–*b* is disposed rearwardly where it gradually joins and becomes coincident with the cylindrical outer wall of the cylindrical portion 27–*a* of the pin member. The tapers of the internal wall of the socket member 24 and the external wall of the tapered portion 27–*b* are substantially complementary to each other so that upon insertion of the tapered portion 27–b into the socket member 24, there is interengagement of the opposed walls along the common lines of the opposed tapered walls. To limit the area of interengagement between the opposed tapered walls of the socket member 24 and the tapered portion 27–b, one or both of these walls may be relieved. For example, I show the socket member 24 being relieved along the recessed portion 38, which extends circumferentially therearound. By limiting the area of the interengaged walls in contact with each other, excessive jamming or wedging of the parts together may be controlled and minimized. It is also to be noted that the angle of inclination of the opposed tapered walls to the axis of the pin member is such that the taper is fast enough, that is, the angle is great enough, that excessive jamming or wedging of the tapered portion 27–b in the socket member 24 is controlled and minimized.

Of course, the degree of the taper or inclination of the tapered portion 27–b and the internal wall of the socket member 24 forwardly and rearwardly of the relieved portion 38 need not be the same. For example, the taper of the interengaged surfaces at the location forwardly of the relieved portion or recess 38 may be inclined at a different angle to the axis of the pin member than are the opposed interengaged surfaces at a location in the socket member rearwardly of the relieved portion or recess 38. Also, the tapers of interengaged surfaces at different axially spaced locations may not necessarily be coincident, that is, may not lie along sides of the same conical figures.

The rearward end of the pivot pin member 27 is threaded and a thrust nut 28 is threadably engaged thereto to prevent axial withdrawal of the pivot pin member forwardly through the sleeve member 25. The locking nut 29 is also threadably attached to the pin member to lock the nut 28 to the pin member. Positioned between the rearward end of the sleeve member 25 and the nut 28 is an end thrust washer 31. Positioned over and around the washer 31 is a channel-shaped rubber seal member 32.

The forward end of the pivot pin member 27 is threaded to provide the threaded end portion 27–c. A nut 36 is threadably engaged to this threaded end portion 27–c and spanner wrench holes 37 facilitate turning the nut 36 firmly to required position on the threaded end portion 27–c. Interposed between the nut 36 and the forward end of the socket member 24 is an end thrust washer 30. This end thrust washer 30 engages a shoulder of the pin member at the juncture of the tapered portion 27–b and the threaded portion 27–c.

Positioned between the sleeve member 25 and the socket member 24 is a thrust washer 33 of annular form. Positioned on and around the thrust washer 33 is a channel-shaped rubber seal member 34.

In the use of my invention, vehicles such as trucks may be shipped and transported in two parts; that is, the forward portion and the rearward portion may be disassembled for purposes of shipment. Upon arrival at the point of use, such as in the field, the two parts of the vehicle may be readily and quickly assembled by the use of my connection. The two vehicle parts may be positioned so that the pin member 27 and the socket member 24 are in approximate or general alignment. Because of the tapered disposition of the internal walls of the socket member and the external walls of the pin member, the parts need not be in perfect axial alignment in order to introduce the pin member into the socket member. Upon the forward end of the pin member contacting the inclined or tapered wall of the socket member, the pin member is cammed or guided into correct axial alignment. Upon moving the two vehicle parts together so as to move the pin member into the socket member, the pin member correctly seats itself in the socket member and the pin member and socket member guide themselves into axial alignment.

The parts in unassembled position are illustrated in Figure 3. When it is desired to introduce the pin member into the socket member, the nut 36 and thrust washer 30 are, of course, absent from the front end of the pin member. As seen in Figure 3, by moving the socket member and pin member toward each other, the pin member is readily introduced into the socket member. Upon the pin member going forward into the socket member to where the opposed tapered walls are in engagement, the threaded end portion 27–c protrudes forwardly out from the socket member as illustrated in Figure 2. Upon placing the washer 30 in position and threadably turning the nut 36 on to the threaded portion 27–c firmly against the washer 30, the connecting device is completely assembled and the vehicle portions are interconnected so that the vehicle is ready to operate as a unit.

In the present form of my invention, the opposed tapered walls of the tapered portion 27–b and socket member 24 tend to frictionally engage so that there is substantially no rotation between the pin member and the socket member. The rotation in this swivel connection is provided between the pin member and the sleeve member 25, the bearing bushings 35 providing a good bearing for this rotative movement. It is seen that the pin member 27 may rotate within the sleeve member 25 and also the sleeve member 25 may revolve around the pin member 27. Therefore, by this construction, a good swiveling action is obtained between the forward and rearward portions of the vehicle. By the unique construction disclosed, there is provided not only a good swivel connection by the transverse divided portions of a vehicle, but there is also provided a quick and easily operated connection and disconnection between the two portions of the vehicle.

For the ready disassembly of my connecting device, the nut 36 and thrust washer 30 are removed from the forward end of the pin member 27. To overcome any jamming or wedging of the tapered portion of the pin member in the socket member, the forward end of the pin member may be pushed rearwardly so as to force the pin member out of the socket member. This may be done manually or by other suitable mechanical means. I show a convenient method of forcing the pin member out of the socket member by hydraulic means. In this arrangement, a fluid conduit 39 communicates with the relieved portion or recess 38 through the wall of the socket member 24. A coupling 40 on the end of the conduit 39 may be connected with a source of fluid under pressure so as to admit such fluid under pressure into the relieved portion or recess 38. By reason of the difference in the cross-sectional areas affected, such fluid under pressure will exert a rearward force upon the pin member tending to force it rearwardly out of the socket member.

It is seen that by the combination of parts and construction illustrated, there is provided a simple and quick way of both assembling and disassembling the vehicle portions together and at the same time providing a swivel connection between the vehicle portions when interconnected.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a vehicle transversely divided into a forward portion and a rearward portion, each of said portions having transverse elements, respectively, the improvement of a sleeve member having a cylindrical bore extending therethrough secured to the transverse element of one of said portions, a socket member having a frusto-conical internal surface, said socket member being secured to the transverse element of the other of said portions, the bore of said sleeve member and the cavity of said socket member being adapted to be disposed in axial alignment, a pin member having a cylindrical portion mounted in said sleeve member and rotatable therein, said pin member having a pintle portion axially aligned with said cylindrical portion and protruding from said sleeve member, said pintle portion having a frusto-conical exterior surface, said pin member being insertable in said socket member and the frusto-conical external surface of the pintle portion being complementarily engageable by the frusto-conical internal surface of said socket member to frictionally interengage said pin member and socket member, and securing means for detachably securing said pin member and said socket member together against axial separation.

2. In a vehicle transversely divided into a forward portion and a rearward portion, each of said portions having transverse elements adapted to be disposed in juxtaposition upon joining of said portions, apparatus for joining said portions and to permit swiveling action therebetween, said apparatus comprising a sleeve member carried by the transverse element of one of said portions and having its axis disposed longitudinally of the vehicle, a socket member carried by the transverse element of the other of said portions and having its axis disposed longitudinally, the internal wall of said socket member having axially spaced portions of progressively decreasing diameter, the maximum diameter being disposed adjacent the outer end of said socket member, a pin member having a first portion adjacent one end thereof and a second portion adjacent the opposite end thereof, said first portion of the pin member being rotatably mounted in said sleeve member to permit said one portion of the vehicle to pivotally swing on the axis of said pin member, the internal wall of said second portion of the pin member having axially spaced portions of progressively decreasing diameter, the minimum diameter being disposed adjacent the free end of the pin member away from said first portion of the pin member, said second portion of the pin member being insertable in said socket member to provide complementary interengagement of said spaced portions of said inner and outer walls, respectively, and securing means for retaining said pin member in said sleeve member and in said socket member.

3. In a vehicle divided transversely intermediate its ends into a forward portion and a rearward portion, the improvement of two axially aligned hollow members, one carried by the forward portion and the other carried by the rearward portion, a pivot pin member positioned in both said hollow members and in axial alignment therewith, said pivot pin member and a first of said hollow members having opposed interengaging annular surfaces disposed parallel to the axis of the pin member and adapted to provide a bearing for the rotation of said pin member relative to said first hollow member, said pivot pin member and the second of said hollow members having opposed interengaging annular surfaces disposed at angles inclined to the axis of said pin member and directed radially outward and toward the first of said hollow members, the respective ends of said pin member and second hollow member farthest removed from said first hollow member being smaller in diameter than said pin member and second member at a location adjacent said first hollow member to facilitate the introduction of said pin member into said second hollow member, and retaining means positioned adjacent the opposite ends of said pivot pin member for preventing axial withdrawal of said pivot pin member from said hollow members.

4. In a vehicle divided transversely into a forward portion and a rearward portion, the improvement of two axially aligned hollow members, one of said hollow members having a cylindrical hollow opening and carried by one of said vehicle portions, the other of said hollow members having a frusto-conical hollow opening and carried by the second of said vehicle portions, the smaller end of said frusto-conical hollow opening being spaced a greater axial distance from the said one hollow member than the larger end of said frusto-conical hollow opening, a pivot pin member positioned in both said hollow members and in axial alignment therewith, said pivot pin member having a cylindrical portion positioned in the cylindrical hollow opening of said one hollow member, bearing means interengaging said pivot pin member and said one hollow member providing for the ready rotation about their common axis of one of said pivot pin members and said one hollow member relative to the other, said pivot pin member having a frusto-conical portion positioned in the frusto-conical hollow opening of the said other hollow member and complementarily interengaging said other hollow opening to be held thereby, the smaller ends of said frusto-conical opening and of the said frusto-conical portion of the pivot pin member, respectively, being directed away from the said one hollow member to facilitate introduction of the pivot pin member into said other hollow member upon axial movement of said vehicle portions together, and retaining means connected to said pivot pin member for retaining the pivot pin member against withdrawal from said hollow members in an axial direction.

5. Apparatus for pivotally connecting the forward and rearward sections of a transversely divided vehicle, said vehicle having first and second transverse members arranged alongside of each other and transversely of the vehicle, the first transverse member being secured to the forward section and the second transverse member being secured to the rearward section, comprising a sleeve member and a socket member in registration and aligned along the axis of the vehicle, the socket member being carried by one of said transverse members, the sleeve member being carried by the other of said transverse members, a pin member extending through said socket member and sleeve member and in axial alignment therewith, said sleeve member being revolvable about said pin member and relative to said socket member, head elements carried by said pin member adjacent the opposite ends thereof to prevent axial withdrawal of said pin member from said socket member and sleeve member, respectively, the head member adjacent the end of the pin member extending through said socket member being readily detachable from the pin member to permit axial withdrawal of the pin member from said socket member, said socket member having internal walls angularly inclined to the axis of the socket member and extending radially inward from the opening of the socket member adjacent said sleeve member, said pin member having a tapered portion extending outwardly from said sleeve member and complementarily interengageable with said angularly inclined internal walls of said socket member, said tapered portion having its smaller end extended away from said sleeve member and providing for ready introduction of the pin member into said socket member and facilitating the axial alignment of the tapered portion in said socket member.

6. In a swivel connection for separable portions of a vehicle providing for swivel action between the vehicle portions along the longitudinal axis of the vehicle, comprising a pivot pin member extending between said portions, bearing means carried by one of said vehicle portions and engaging a first end portion of the pin member to permit rotative movement between the one vehicle portion and said first end portion of the pin member, socket means carried by the other of said vehicle portions and engaging a second end portion of the pin member, said socket means having internal walls and said second end portion having external walls disposed at angles inclined to the axis of the pin member and sloping radially inward toward the free end of said second end portion of the pin member, said internal and external walls being interengaged to support and align said second end portion relative to the socket means, said internal and external walls being adapted to guide the pin member into axial alignment with said socket means upon introduction of the second end portion into said socket means, one of said internal walls and external walls being relieved from the other along an axial length of the socket means and intermediate interengaged portions of the internal and external walls to provide an enclosed space and to limit the extent of interengagement of said walls within said socket means, and detachable securing means engaging said pin member for securing the pin member against axial withdrawal from said socket means.

7. In a swivel connection for separable portions of a vehicle providing for swivel action between the vehicle portions along the longitudinal axis of the vehicle, comprising a pivot pin member extending between said portions, bearing means carried by one of said vehicle portions and engaging a first end portion of the pin member to permit rotative movement between the one vehicle portion and said first end portion of the pin member, socket means carried by the other of said vehicle portions and engaging a second end portion of the pin member, said socket means having internal walls and said second end portion having external walls disposed at angles inclined to the axis of the pin member and sloping radially inward toward the free end of said second end portion of the pin member, said internal and external walls being interengaged to support and align said second end portion relative to the socket means, said internal and external walls being adapted to guide the pin member into axial alignment with said socket means upon introduction of the second end portion into said socket means, one of said internal walls and external walls being relieved from the other along an axial length of the socket means and intermediate interengaged portions of the internal and external walls to provide an enclosed space and to limit the extent of interengagement of said walls within said socket means, conduit means extending through the socket means and communicating with the said enclosed space for permitting the introduction of fluid under pressure through the conduit means to the said enclosed space for facilitating the separation of said second end portion of the pin member from the socket means, and detachable securing means engaging said pin member for securing the pin member against axial withdrawal from said socket means.

References Cited in the file of this patent

UNITED STATES PATENTS

| | | |
|---|---|---|
| 1,371,594 | Alden | Mar. 15, 1921 |
| 2,366,166 | Willock | Jan. 2, 1945 |